United States Patent [19]
Coteus et al.

[11] Patent Number: 6,098,176
[45] Date of Patent: Aug. 1, 2000

[54] SINUSOIDAL CLOCK SIGNAL DISTRIBUTION USING RESONANT TRANSMISSION LINES

[75] Inventors: Paul William Coteus, Yorktown Heights, N.Y.; Daniel Mark Dreps, Georgetown, Tex.; Frank Ferraiolo, Essex, Vt.; Gerard Vincent Kopcsay, Yorktown Heights; Todd Edward Takken, Mt. Kisco, both of N.Y.

[73] Assignee: International Business Machines Corporation, Armonk, N.Y.

[21] Appl. No.: 09/016,788

[22] Filed: Jan. 30, 1998

[51] Int. Cl.[7] ............................................. G06F 1/12
[52] U.S. Cl. ............................................. 713/400; 713/500
[58] Field of Search ................................ 713/400, 500, 713/503, 600

[56] References Cited

U.S. PATENT DOCUMENTS

| | | | |
|---|---|---|---|
| 4,023,125 | 5/1977 | Wolfe | 333/238 |
| 5,528,202 | 6/1996 | Moline et al. | 333/33 |
| 5,726,596 | 3/1998 | Perez | 327/292 |
| 5,812,708 | 9/1998 | Rao | 385/14 |

*Primary Examiner*—Dennis M. Butler
*Attorney, Agent, or Firm*—Daniel P. Morris; Perman & Green, LLP

[57] ABSTRACT

A clock signal distribution system is disclosed for providing synchronous clock signals to a plurality of electronic circuit devices. The system includes a clock signal generator means for providing a single frequency sinusoidal clock signal output and a plurality of electronic circuit devices. A clock signal distribution network including interconnected resonant segments of a transmission line 13 connected to the clock signal of the clock signal generator and to the plurality of electronic circuit devices for providing separate synchronous, phase aligned clock signals to the electronic circuit devices. The transmission line segments have lengths matched to the clock signal frequency wavelengths to eliminate clock signal distribution problems such as skew, jitter and pulse distortions.

19 Claims, 8 Drawing Sheets

SINUSOIDAL CLOCK SIGNAL DISTRIBUTION USING RESONANT TRANSMISSION LINES

FIELD OF THE INVENTION

The present invention relates to clock signal distribution techniques for computer systems, and more particularly to a system for providing periodic, synchronous, phase-aligned clock signals to elements of a digital computer.

DESCRIPTION OF THE BACKGROUND ART

Distributing clock signals to many devices such as circuit chips with minimum skew is a difficulty in high speed digital computers. Ideally, the clock signal provides a system-wide time reference which is used to synchronize the operation of the computer logic circuitry. In practice there are a number of effects which limit the simultaneity of clock pulse arrival times at the various chips and circuits. These include, clock oscillator jitter, pulse distortion, pulse risetime degradation, pulse reflections, and asymmetries or length variations in the clock distribution wiring, connector and module parasitics.

SUMMARY OF THE INVENTION

The present invention provides a system that eliminates the clock signal distribution problems of the prior art by using a single frequency sinusoidal clock, or a differential pair of such sinusoidal clocks to provide a system wide timing reference, in contrast to typical pulse or square wave clock signals. This reduction of skew and jitter in the clock distribution system enables faster clock cycle times.

The object of the present invention is to provide a clock signal distribution system and method using a single frequency sinusoidal clock to provide a system-wide timing reference.

Another object of the present invention is to provide a clock signal distribution system and method using a sinusoidal clock in combination with interconnected resonant segments of a transmission line to provide a system wide timing reference.

Other and further features, advantages and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention and, together with the description, serve to explain the principles of the invention in general terms. Like numerals refer to like parts throughout the disclosure.

DETAILED DESCRIPTION OF THE PREFERRED EMBODIMENT

Figure 1:
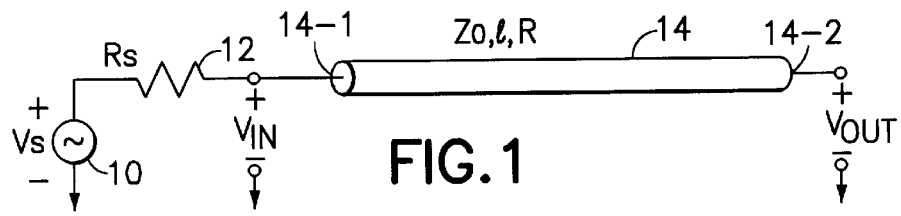
FIG. 1 is a schematic illustration of an embodiment of an open circuit transmission line segment in combination with a sinusoidal oscillator for providing clock signals according to the principles of the present invention.

The present invention provides a solution to clock signal distribution problems such as clock oscillator jitter, pulse distortion, pulse risetime degradation, pulse reflections and asymmetries or length variations in the clock distribution wiring, connector and module parasitics. The invention employs the fact that under single frequency sinusoidal excitation, a standing wave will exist on an unterminated transmission line whose length is a significant fraction of the wavelength. This principle is described in the publication by Robert E. Collin, *Foundations for Microwave Engineering*, McGraw-Hill, Inc., 1969, Sections 3.5 and 7.2, and is used widely in RF and microwave device and component design (e.g. filters, antennas, etc.) The present invention uses such design techniques to overcome the problems of digital system clock signal distribution.

The relevant characteristic of a standing wave which is used in the present invention for clock signal distribution is that as the voltage on a transmission line varies with time, it oscillates in phase, or with a 180 degree phase reversal, at all points on the line. Even for small to moderate resistive and/or dielectric losses, the phase along the transmission line is nearly constant between nodes of the standing wave. In the present invention the effects of such losses are not a significant factor. Therefore, in the present invention, a periodic time reference is established at various clock receivers placed at selected points along the resonant transmission line structure by the zero or mid-amplitude crossings, of the sinusoidal waveform. Alternatively, a pair of resonant transmission line structures which are driven differentially (180 degrees out of phase with each other) may be used, and in this case the time reference is determined by the voltage cross-over of the difference of the positive and negative going waveforms. Voltage amplitude is, however, dependent on position along the resonant line, and on frequency. A relatively large voltage amplitude is required to extract an accurate time for voltage crossover using a single ended or differential clock receiver. Therefore, it is necessary to select a line geometry which provides sufficient voltage amplitude over the desired operating frequency range to switch the digital circuits which receive the clock signal. The understanding of the selection of these line geometries is essential to the present invention. By using resonant transmission line lengths to connect the clock oscillator to the receiver circuits, the transmitted voltage amplitude may be maximized. Furthermore, by properly selecting the transmission line lengths in a clock distribution tree, it is possible to distribute clocks to a multitude of chips on a printed circuit board or a multichip module with extremely low skew, and sufficient voltage amplitude to insure the desired noise immunity. In addition, by using microwave tuning techniques, proper operation of the clock distribution can be obtained over a large useful frequency range. Other techniques described herein can be used to effectively broaden the resonant frequency range, and further enhance the useable operating frequency of the clock circuit. Also, designs which provide for running the clock at a lower operating frequency during system bring-up and debug are possible, and are described below.

Figure 2:
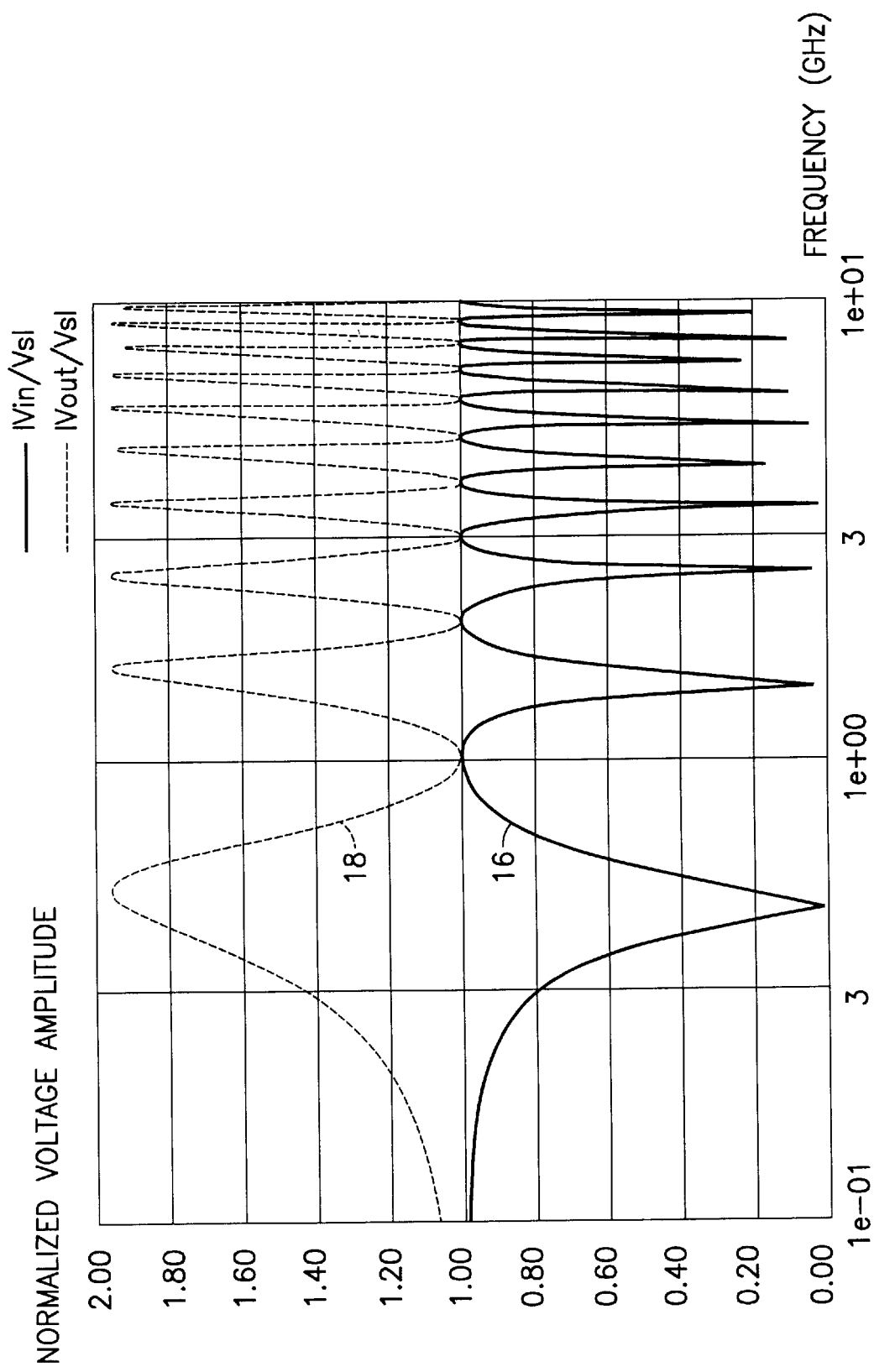
FIGS. 2, 3, and 4 are illustrations of the curves of voltage amplitude as a function of frequency for different values of source impedance in the embodiment of FIG. 1.
Figure 3:
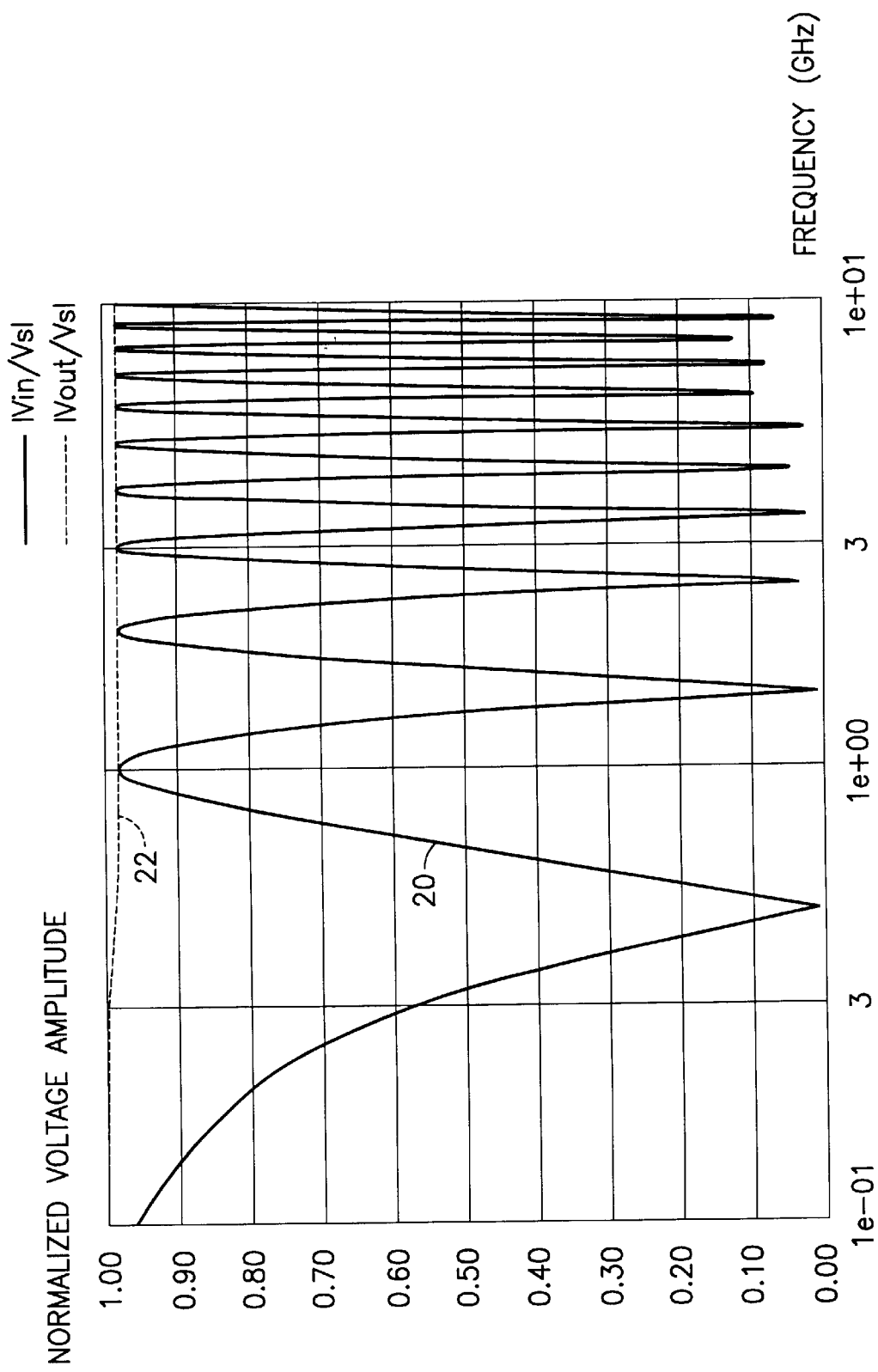
Figure 4:
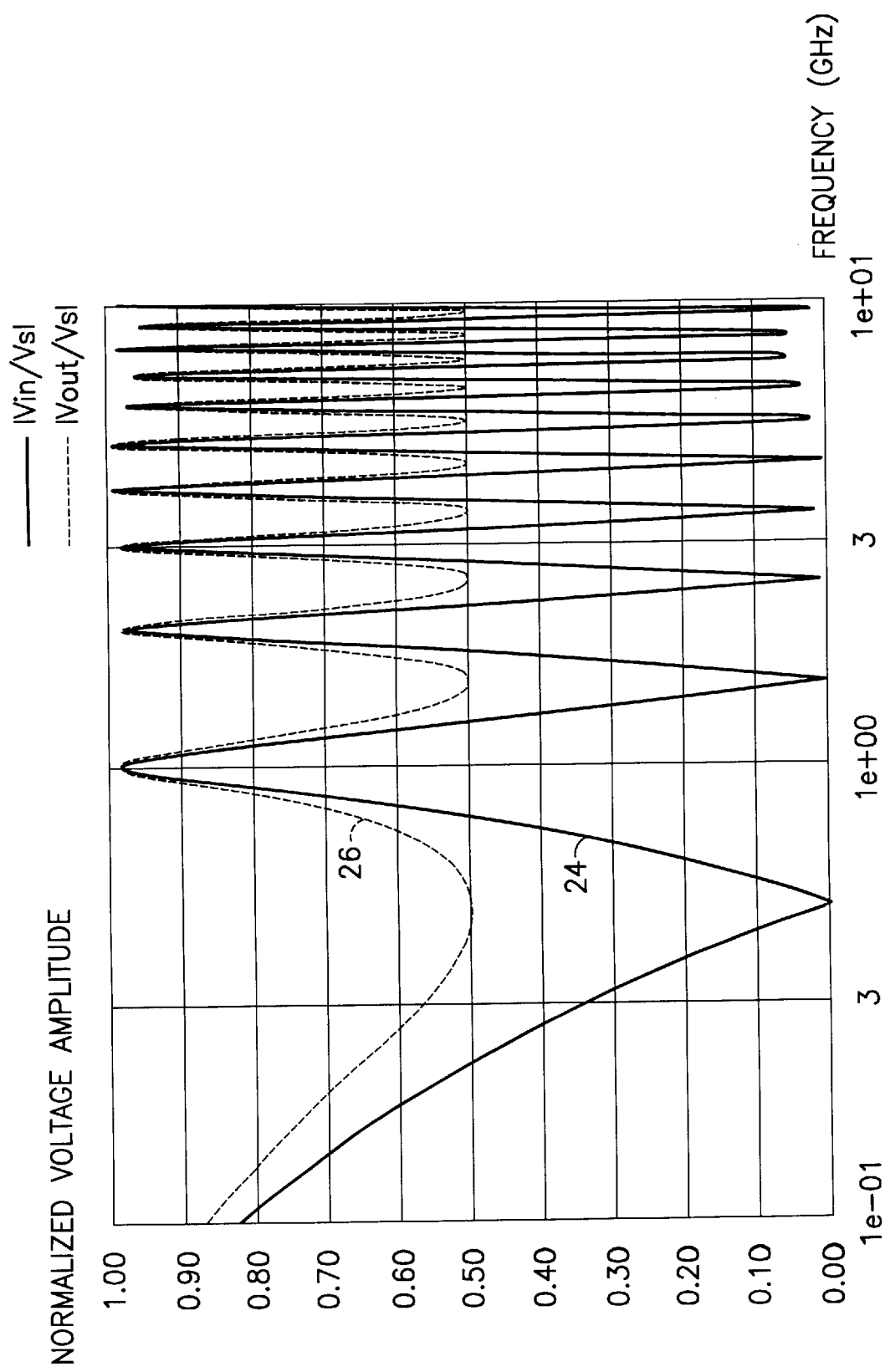

The principle of the resonant clock distribution system of the present invention is illustrated most simply by the circuit shown in FIG. 1. In FIG. 1, a sinusoidal oscillator, 10, having a source impedance, 12, is connected to and drives a length of open circuited transmission line, 14 having a length 1, an impedance $Z_o$ and a resistance R. Three possible operating conditions are as follows. In FIG. 2, curve 16 shows the normalized voltage amplitude (Vin/Vs) at the transmission line input, 14-1, and curve 18 shows the normalized voltage amplitude (Vout/Vs) at the open circuited transmission line output, 14-2, as a function of frequency under the condition that the source impedance, 12, is less than the characteristic impedance, $Z_o$, of the transmission line, 14 (Rs<$Z_o$) Curve 20 of FIG. 3 shows the normalized voltage amplitude at the transmission line input, 14-1, and curve 22 shows the normalized voltage amplitude at the open circuited transmission line output, 14-2, as a function of frequency under the condition that the source impedance, 12, is equal to the characteristic impedance, $Z_o$, of the transmission line, 14 (Rs=$Z_o$). Curve 24 of FIG. 4 shows the normalized voltage amplitude at the transmission line input, 14-1, and curve 26 shows the normalized voltage amplitude at the open circuited transmission line output, 14-2, as a function of frequency under the condition that the source impedance, 12, is greater than the characteristic impedance, $Z_o$, of the transmission line, 14 (Rs=$Z_o$). The amplitudes in FIGS. 2, 3 and 4 are normalized to the open circuit output voltage of the sinusoidal oscillator, 10.

The output voltage amplitude 22 under matched impedance conditions shown in FIG. 3 is seen to be slowly decreasing with increasing frequency due to resistive line attenuation. There is no resonance in the output voltage, i.e., peaking at a particular frequency. However, the output voltage amplitudes 18 and 22 in FIGS. 2 and 4 are resonant, and exhibit maxima at frequencies which occur at odd multiples of a quarter wavelength in FIG. 2, or at integral multiples of a half wavelength in FIG. 4. Selecting the transmission line length such that the desired operating frequency is at or near one of the voltage amplitude maxima, provides the largest voltage and dv/dt available to drive a high input impedance receiver, and provides the most noise immunity and minimum jitter for detection of the clock signal by the receiving chip.

Figure 5:
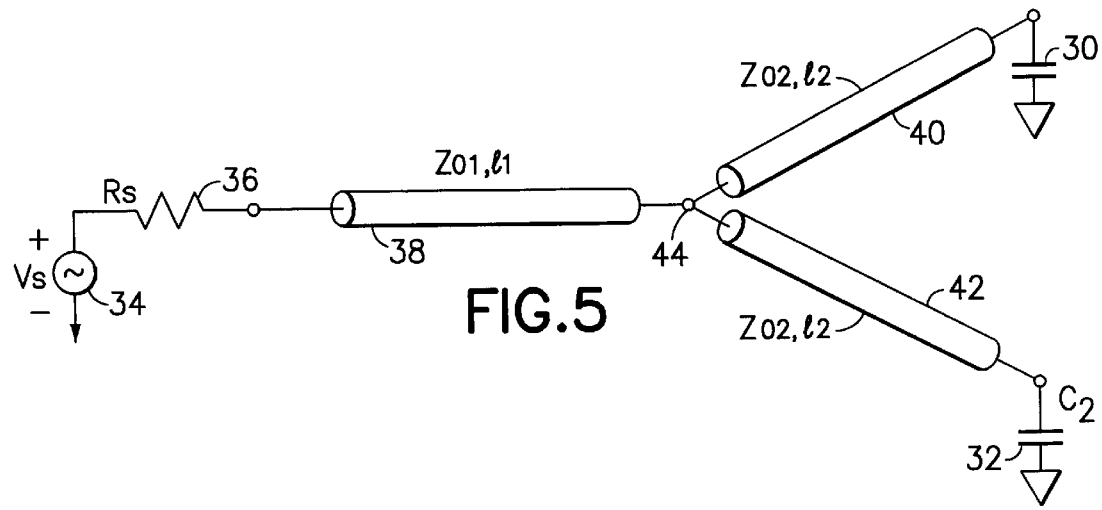
FIG. 5 is a schematic illustration showing a sinusoidal clock signal distribution embodiment of the invention for a pair of circuit chip loads.
Figure 7:
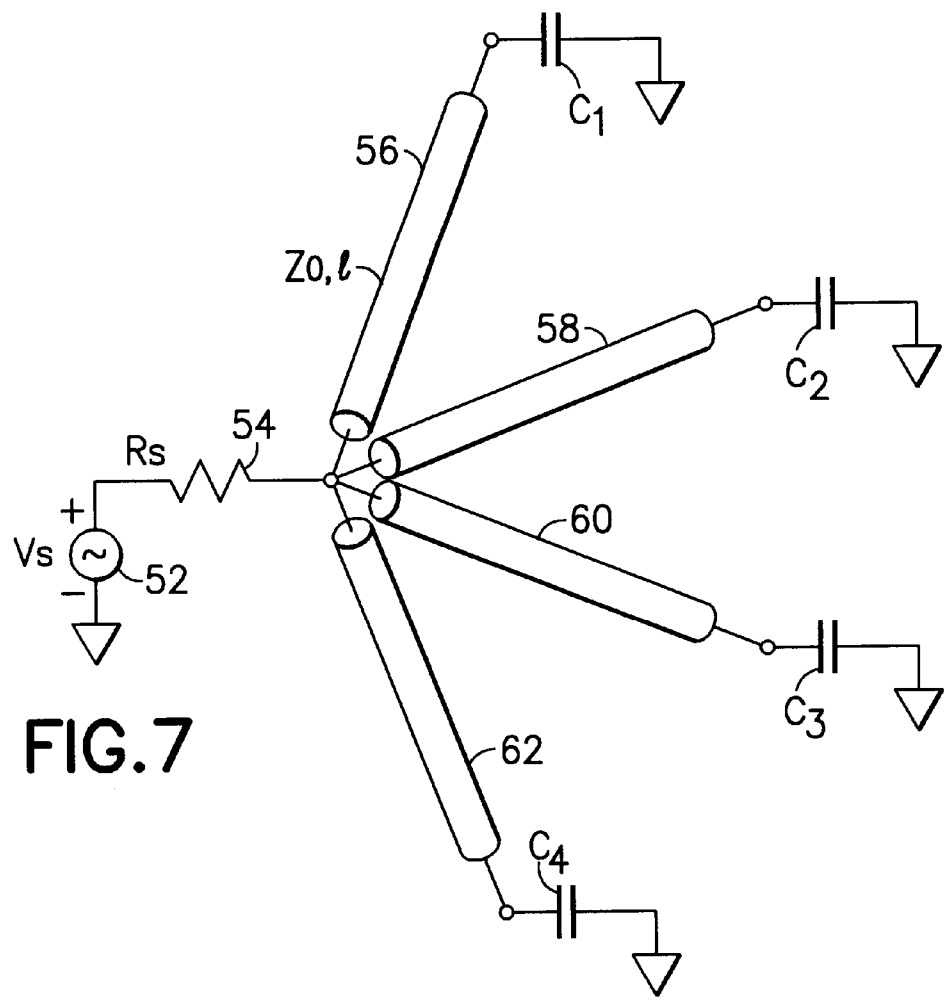
FIG. 7 is a schematic illustration showing a sinusoidal clock signal distribution embodiment of the invention for four circuit chip loads.

FIGS. 5 and 7 show more realistic embodiment configurations for clock distribution systems which provide a synchronous clock signal to multiple chips. In FIG. 5 a pair of chip loads, represented by the capacitors 30 and 32, are coupled to the sinusoidal oscillator 34, having a source impedance 36, by a network of transmission line segments, 38, 40 and 42. The transmission line segments lengths are chosen to simultaneously provide voltage amplitude maxima at node 44, and at the output nodes where capacitors 30 and 32 are connected. This condition is achieved when the transmission line segments 40 and 42 are approximately integral multiples of a half wavelength. Due to the small capacitive load presented by the chips, the transmission line segment length required for a resonance is slightly shorter than the ideal half wavelength.

Several configurations are possible for the optimum length of transmission line segment 38, corresponding to the three cases shown in FIGS. 2, 3 and 4. If Rs<$Z_{o1}$, the length of line 38 is chosen to be approximately an odd multiple of quarter wavelengths which reinforces the voltage maximum at node 44. If Rs=$Z_{o1}$, the voltage amplitude at node 44 is relatively independent of the length of line 38. If Rs>$Z_{o1}$, the length of line 38 is chosen to be approximately an integral multiple of half wavelengths which reinforces the voltage maximum at node 44. Case one, with RS<$Z_{o1}$, provides the largest signal amplitude but the narrowest operating bandwidth. However, this configuration may not be practical since it requires an oscillator with low output impedance, and/or large transmission line characteristic impedance. Case two, with RS=$Z_{o1}$, provides wide bandwidth, but is not easily extendable to multiple chip distribution. Case three, with Rs>$Z_{o1}$, results in a wider bandwidth than case one, but lower peak amplitude. In a practical design, case three is most readily achieved using realistic oscillator and line impedances.

Figure 6:
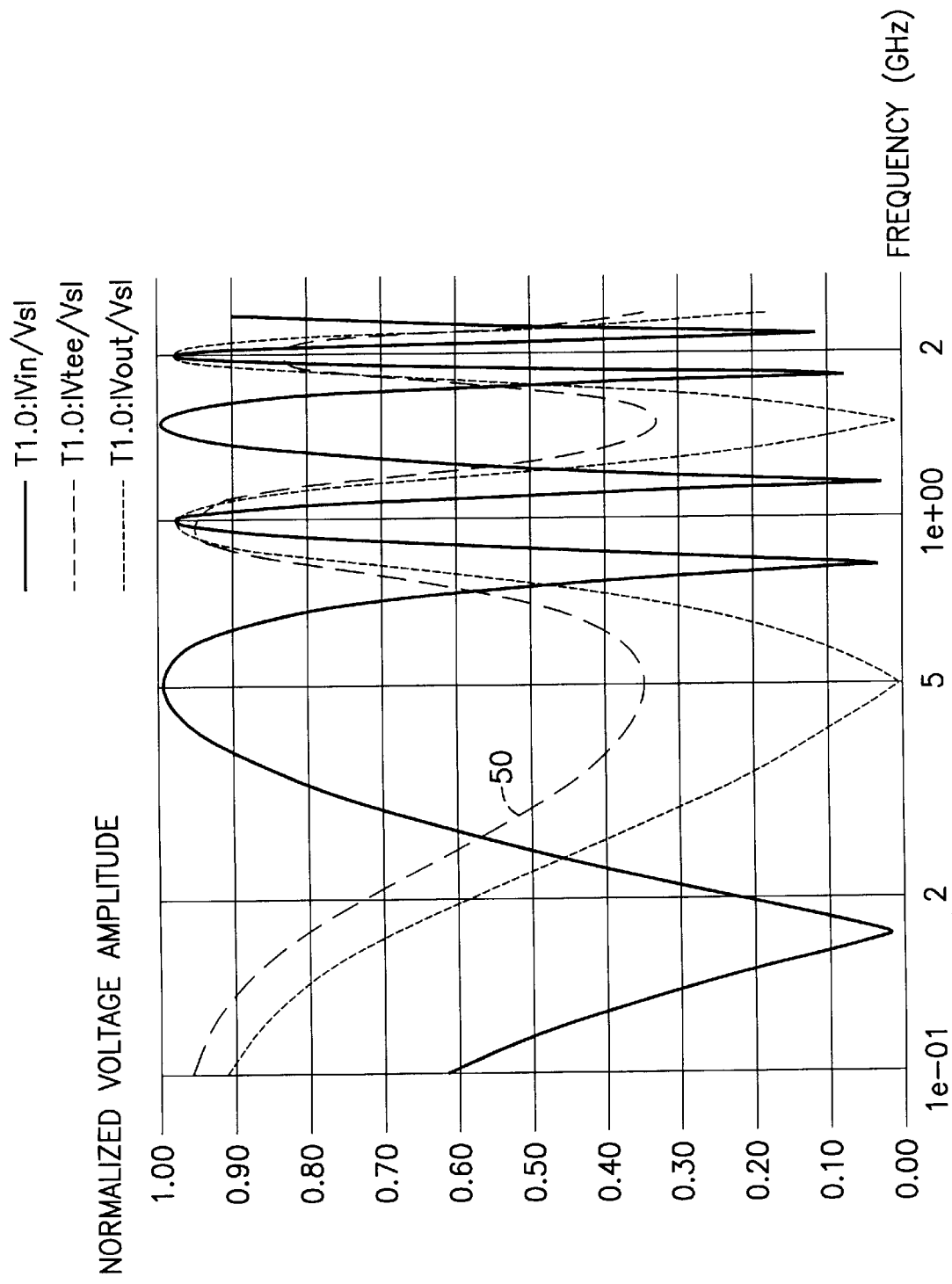
FIG. 6 is an illustration of the curve of voltage amplitude as a function of frequency for the embodiment of FIG. 5.

FIG. 6 shows a curve of the normalized voltage amplitude variation with frequency at the source, the tee-connection node, 44, and at the loads, 40 and 42 as a function of frequency for Rs>$Z_{o1}$. The voltage amplitude maxima shown in FIG. 6 are seen to occur as described above. In particular, the confluence of amplitude maxima, which is observed at about 1 GHz results in the largest amplitude clock signal presented to the load, and the greatest dv/dt and lowest jitter. Of particular interest is the fact that nearly 100% of the input waveform 50 (Vout/Vs is nearly 1.00) is delivered to both chip inputs, in a resonant network.

In the configuration shown in FIG. 5, the peak amplitude of the maxima, and its width are dependent upon the impedance ratios $Z_{o1}$/Rs and $Z_{o2}$/$Z_{o1}$. For example, by choosing the main distribution line impedance, $Z_{o1}$, to be lower than the branch line impedances, $Z_{o2}$, in the cluster at the end of the line, a wider operating frequency bandwidth can be obtained if the source oscillator impedance can be made low enough. The simulated phase variation between the two receiver points is less than 0.2 degrees (0.5 ps at 1 GHz), even with a 10 mm difference in length between the cluster branch lines, 40 and 42, assuming an operating frequency of 1 GHz. An alternative transmission line network for distributing a synchronous clock signal to multiple chips is shown in FIG. 7. In this case the oscillator, 52, having a source impedance, 54, is connected to and drives a parallel cluster of four transmission line segments 56, 58, 60 and 62. This configuration is readily generalized to any number (n) loads. Since the effective transmission line input impedance driven by the oscillator source 52 is $Z_o$/n, practical application with realizable oscillator and line impedances will have Rs>$Z_o$/n. Thus, line lengths must be chosen approximately as multiples of a half wavelength at the clock frequency.

Figure 8:
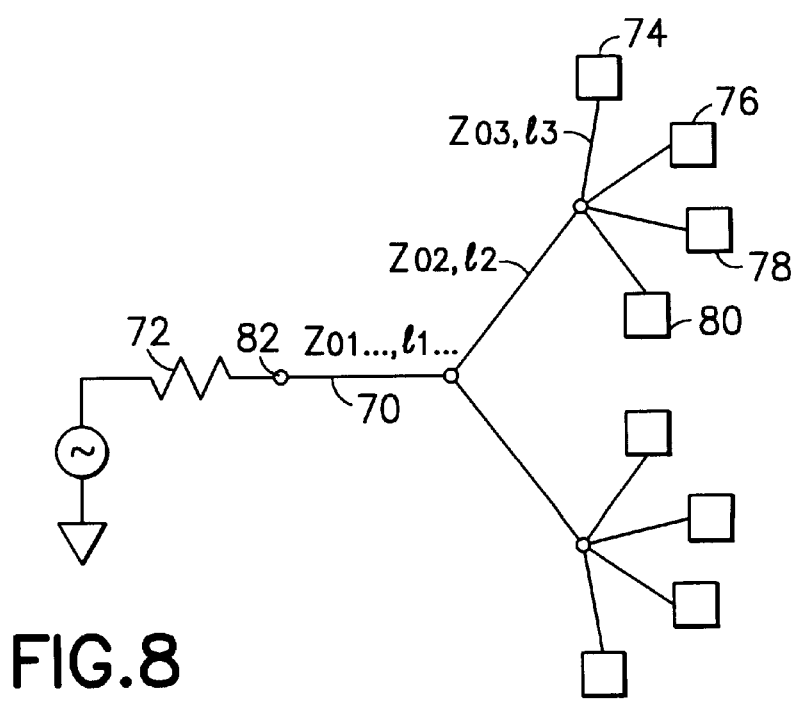
FIG. 8 is a schematic illustration of an eight circuit chip distribution network embodiment of the invention using a multiple level branching technique.

FIG. 8 shows an eight chip clock signal distribution network using a multiple level branching scheme which is a combination of the techniques described for FIGS. 5 and 7. The configuration of FIG. 8 can be generalized to a larger number of chips.

The clock signal distribution networks shown in FIGS. 5, 7 and 8 are illustrated as single ended designs with only a single clock source. Any of these configurations can be realized as a differential clock distribution system by using two identical networks driven by sinusoidal clock signals which are 180 degrees out of phase. In addition, each branch of such clock signal distribution network can use closely coupled lines for the two clock phases to minimize common mode noise, as is standard practice when using differential signaling.

The width, amplitude and frequency of the resonance can be changed by modifying the driving source and input coupling to the multi-drop resonant clock structure. Well known principles of microwave filter and impedance matching structure design such as disclosed in the publication by George L. Matthaei, Leo Young, and E. M. T. Jones, Microwave Filters, *Impedance-Matching Networks and Coupling Structures*, McGraw-Hill, Inc. 1964, Chapter 5, Section 5.08, and Chapters 6, 9 and 11 may be applied to optimize for peak voltage amplitude or operating frequency range. Thus, for example, the length 1 of the transmission line 70 in FIG. 8 can be modified with a resultant change in the resonant frequency of the circuit.

Figure 9:
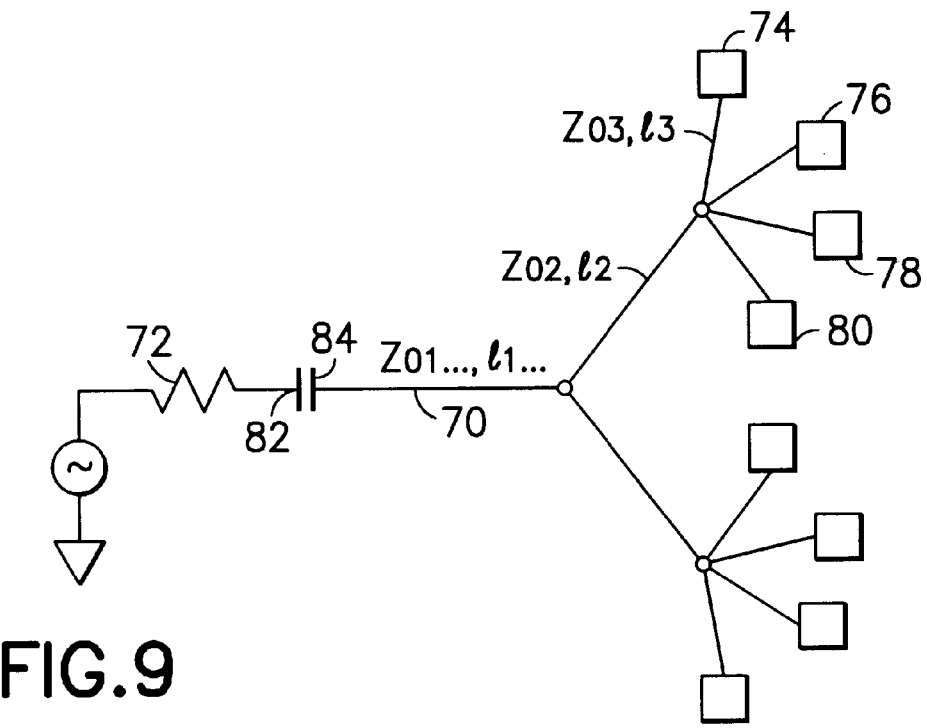
FIG. 9 is a schematic illustration of an eight circuit chip distribution network embodiment of the invention using a series capacitor.
Figure 10:
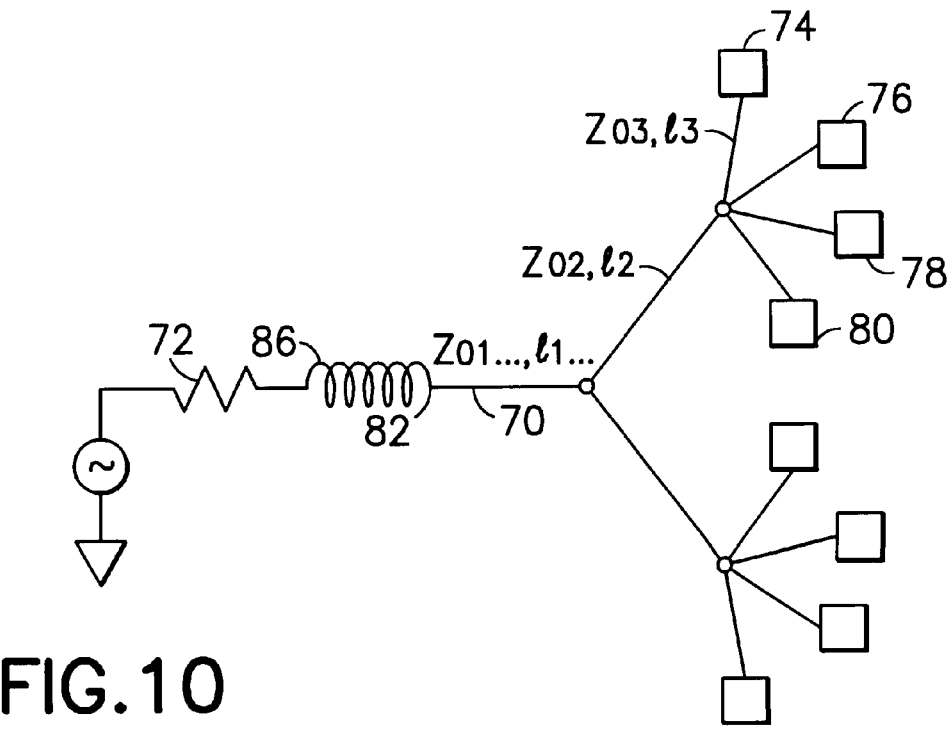
FIG. 10 is a schematic illustration of an eight circuit chip distribution network embodiment of the invention using a series inductance.
Figure 11:
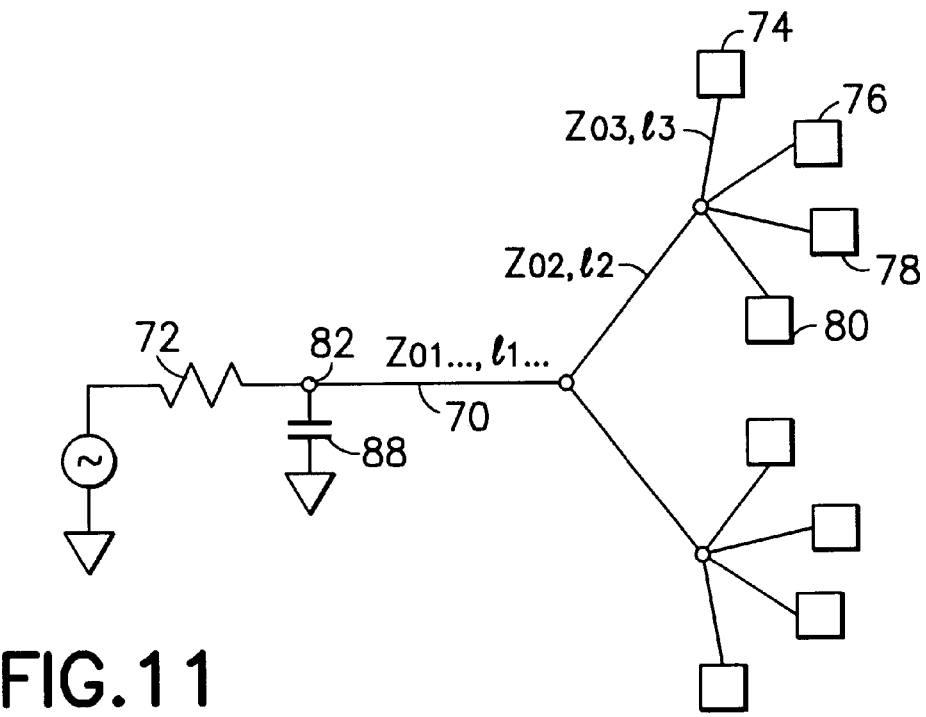
FIG. 11 is a schematic illustration of an eight circuit chip distribution network embodiment of the invention using a parallel capacitor.
Figure 12:
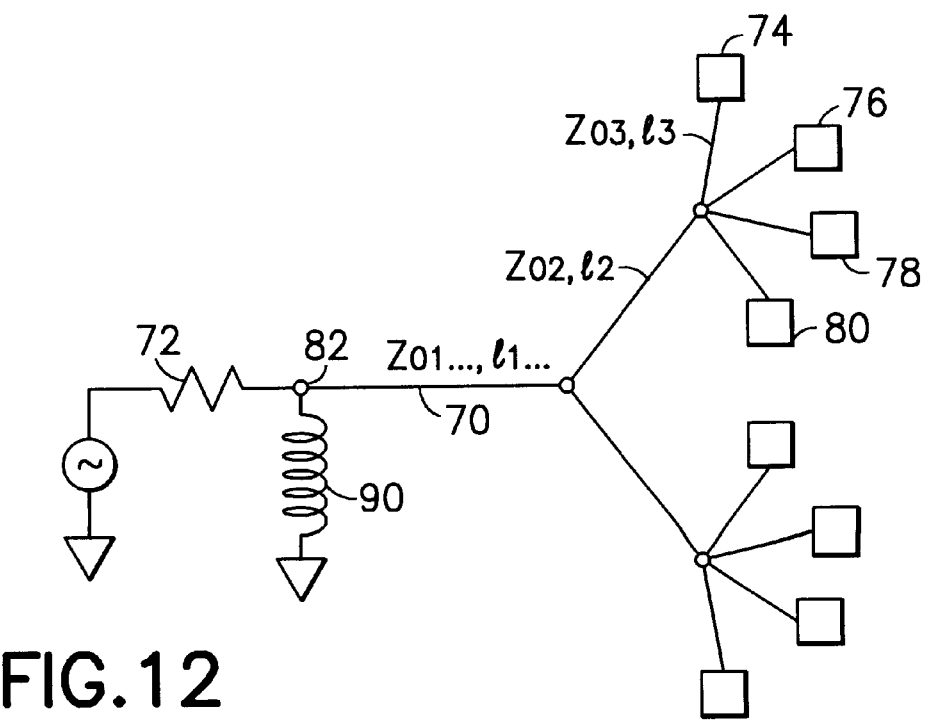
FIG. 12 is a schematic illustration of an eight circuit chip distribution network embodiment of the invention using a parallel inductance.

Similarly, the value of the impedance $Z_{o1}$ in FIG. 8 the value of the source resistor 72, can be changed, with a resultant change in the width and amplitude of the voltage versus frequency resonance observed at the receivers 74, 76, 78 and 80. If this segment of the transmission line is a removable coaxial cable whose length and impedance can be selected, a variety of resonant clock frequencies can be supported. Alternative embodiments can may be provided by using reactive elements to couple into the resonant clock structure. For example, by inserting a series coupling capacitor 84 at point 82 as shown in FIG. 9, a higher Q resonance can be obtained with larger peak voltage amplitude at the expense of narrower operating bandwidth and shifted resonant frequency. Alternatively, a series inductance 86 may be used in the same manner as shown in FIG. 10 to couple the source to the resonant clock structure in order to realize a high Q structure. Also, as shown in FIGS. 11 and 12 respectively, either a parallel capacitor 88 or inductor 90 may be inserted at point 82 in order to adjust the resonant frequency. These techniques are examples of the application of microwave design principles such as described in the Collin and Matthaei publications to the resonant clock distribution structure. These techniques may also be applied to compensate for the parasitic reactances of the oscillator package or the connectors and modules which interface to the chips which make up the digital system.

In all of the described embodiments, the resonant frequency can be changed by a multiple n, or by a divisor m, where n and m are non-zero positive integers, and where $$\frac{n}{m} \geq 1.$$

Thus if the circuit of FIG. 8 is resonant at 400 MHz it can also be made resonant at 200 and 800 MHz. This feature is important, for example, when testing a high speed circuit at a lower frequency.

While a preferred embodiment of the invention has been disclosed in detail, it should be understood by those skilled in the art that various other modifications may be made to the illustrated embodiment without departing from the scope of the invention as described in the specification and defined in the appended claims.

What is claimed is:

1. A clock signal distribution system for providing synchronous clock signals to a plurality of electronic circuit devices comprising:

a clock signal generator means for providing a single frequency sinusoidal clock signal output, a clock signal distribution network including interconnected resonant segments of a transmission line connected to said clock signal of said clock signal generator for providing separate synchronous, phase aligned clock signals wherein said transmission line segments have lengths matched to said clock signal frequency wavelengths to establish standing waves on said transmission line segments that oscillate in phase at points on the said line segments, to provide a periodic time reference, and a plurality of electronic circuit devices connected to said interconnected resonant segments of said transmission line at selected points at the zero crossings of said standing waves.

2. A clock signal distribution system according to claim 1 wherein said clock signal generator has a source impedance of a first given value, wherein said transmission line segments have a line impedance of a second given value, and wherein said transmission line segments have resonance lengths that are positive integer multiples of a given portion of the wavelength of said single frequency clock signal.

3. A clock signal distribution system according to claim 1 wherein said clock signal generator has a source impedance of a first given value, wherein said transmission line segments have line impedances of at least a second given value, and wherein said transmission line segments have resonance lengths that are positive integer multiples of at least one given portion of the wavelength of said single frequency clock signal.

4. A clock signal distribution system according to claim 2 wherein said source impedance value is less than said line impedance value, and wherein said resonance lengths of said transmission line segments are positive integer multiples of a quarter wavelength of said single frequency clock signal.

5. A clock signal distribution system according to claim 4 further including a series coupling resistor connected between said clock signal general means and said clock signal distribution network to broaden the resonant frequency of said transmission line segments.

6. A clock signal distribution system according to claim 4 further including a series coupling capacitor connected between said clock signal generator means and said clock signal distribution network to adjust the resonant voltage amplitude and frequency of said clock signals.

7. A clock signal distribution system according to claim 4 further including a series coupling inductor connected between said clock signal generator means and said clock signal distribution network to adjust the resonant voltage amplitude and frequency of said clock signals.

8. A clock signal distribution system according to claim 4 further including a parallel resistor connected between said clock signal generator means and said clock signal distribution network to shift or broaden the resonant frequency of said transmission line segments.

9. A clock signal distribution system according to claim 4 further including a parallel inductor connected between said clock signal generator means and said clock signal distribution network to shift the resonant frequency of said transmission line segments.

10. A clock signal distribution system according to claim 4 further including a parallel capacitor connected between said clock signal generator means and said clock signal distribution network to shift the resonant frequency of said transmission line segment.

11. A clock signal distribution system according to claim 4 wherein the length of one or more transmission line segments are variable to shift the resonant frequency or adjust the frequency width of said clock signal.

12. A clock signal distribution system according to claim 2 wherein said source impedance value is greater than said line impedance value and wherein said resonance lengths of said transmission line segments are positive integer multiples of a half wavelength of said single frequency clock signal.

13. A clock signal distribution system according to claim 12 further including a series coupling resistor connected between said clock signal generator means and said clock signal distribution network to broaden the resonant frequency of said transmission line segments.

14. A clock signal distribution system according to claim 12 further including a series coupling capacitor connected between said clock signal generator means and said clock signal distribution network to adjust the resonant voltage amplitude and frequency of said clock signals.

15. A clock signal distribution system according to claim 12 further including a series coupling inductor connected between said clock signal generator means and said clock signal distribution network to adjust the resonant voltage amplitude and frequency of said clock signals.

16. A clock signal distribution system according to claim 12 further including a parallel resistor connected between said clock signal generator means and pair clock signal distribution network to shift the resonant frequency of said transmission line segments.

17. A clock signal distribution system according to claim 12 further including a parallel inductor connected between said clock signal generator means and said clock signal distribution network to shift the resonant frequency of said transmission line segments.

18. A clock signal distribution system according to claim 12 further including a parallel capacitor connected between said clock signal generator means and said clock signal distribution network to shift the resonant frequency of said transmission line segments.

19. A clock signal distribution system according to claim 12 wherein the length of at least one of said transmission line segment are variable to shift the resonant frequency or adjust the frequency width of said clock signal.

* * * * *